United States Patent [19]

Tashiro et al.

[11] Patent Number: 5,658,716
[45] Date of Patent: Aug. 19, 1997

[54] SHEET FILM PACKAGE

[75] Inventors: Katsumi Tashiro; Hitoshi Komiyama; Yoshio Hara, all of Minami-Ashigara, Japan

[73] Assignee: Fuji Photo Film Co., Ltd., Kanagawa, Japan

[21] Appl. No.: 752,142

[22] Filed: Nov. 19, 1996

Related U.S. Application Data

[60] Division of Ser. No. 660,959, Jun. 12, 1996, abandoned, which is a continuation-in-part of Ser. No. 581,483, Dec. 29, 1995, abandoned.

[30] Foreign Application Priority Data

Jan. 4, 1995 [JP] Japan .............................. 7-74

[51] Int. Cl.⁶ .............. G03C 3/00; C03D 13/10; C03D 13/14; C03D 13/08
[52] U.S. Cl. .............. 430/496; 396/511; 396/512; 396/517; 396/518; 396/527; 396/528
[58] Field of Search ............................ 430/207, 496, 430/497; 396/511, 512, 517, 518, 527, 528

[56] References Cited

U.S. PATENT DOCUMENTS

| | | | |
|---|---|---|---|
| 4,370,407 | 1/1983 | Columbus | 430/496 |
| 4,725,865 | 2/1988 | Hoffman | 354/282 |
| 4,821,054 | 4/1989 | Armbuster et al. | 354/282 |
| 5,223,381 | 6/1993 | Hara et al. | 430/496 |
| 5,510,869 | 4/1996 | Affolter et al. | 430/496 |

FOREIGN PATENT DOCUMENTS

| | | | |
|---|---|---|---|
| 4356039 | 12/1992 | Japan | G03C 3/00 |
| 5216173 | 8/1993 | Japan | G03C 3/00 |

*Primary Examiner*—Richard L. Schilling
*Attorney, Agent, or Firm*—Sughrue, Mion, Zinn, Macpeak & Seas

[57] ABSTRACT

A sheet film package contains a sheet film unit in a light-shielding envelope with an open end through which the sheet film unit is movable into and out of the light-shielding envelope. The light-shielding envelope is formed by folding a sheet of light-tight material in half to provide a folded side, and securely sealing joints of the folded sheet along a side opposite side to the folded side as well as an end opposite to the open end, wherein a middle portion of the folded side has a larger folding angle compared with end portions thereof.

6 Claims, 9 Drawing Sheets

SHEET FILM PACKAGE

This is a divisional of application Ser. No. 08/660,959 filed Jun. 12, 1996 now allowed which is a continuation-in-part application of application Ser. No. 08/581,483 filed Dec. 29, 1995, abandoned.

BACKGROUND OF THE INVENTION

1. Field of the Invention

The present invention relates to a sheet film package wherein a sheet of photo film is removably packed in a light-shielding envelope.

2. Background Art

A sheet film package contains a relatively large sheet film, e.g. a 12.5×10 cm format sheet film, which is mainly directed to professional photography. The light-shielding envelope of the sheet film package has an open end for entrance and exit of the sheet film. The open end is sealed with a clip in a light-tight fashion to prevent ambient light from entering the interior of the light-shielding envelope.

To expose the sheet film, the sheet film package is loaded in a film holder attached to the rear side of a camera. When loading the sheet film package, a lock lever of the film holder is set in a releasing position. Thereafter, the sheet film package is inserted in the film holder with the clip located in the innermost position of the film holder. Then, the lock lever is set in a locking position, thereby holding the clip in the innermost position and, simultaneously, allowing the light-shielding envelope to separate from the clip. Most portion of the light-shielding envelope is then withdrawn from the film holder to leave the sheet film in an exposure position behind an exposure frame of the camera.

After exposure of the sheet film, the light-shielding envelope is moved back into the film holder so as to insert the exposed sheet film therein. Where the sheet film is fully inserted in the light-shielding envelope, the open end is sealed with the clip again by resetting the lock lever to the releasing position. Thus, the sheet film and the light-shielding envelope may be removed together from the film holder by pulling out the light-shielding envelope.

As the sheet film package is a single-use article, the manufacturing cost must be low. Japanese Laid-Open Patent Application No. 4-356039 discloses a sheet film package whose light-shielding envelope is made of paper of about 240 μm thick blackened with carbon. To manufacture the light-shielding envelope of the known sheet film package, two identical paper sheets are mated together and sealed along longitudinal edges with side-sealing tapes, whereas one end is sealed with an adhesive agent. Although the black paper is cheap, this known configuration requires a large amount of side-sealing tape, two taping machines and accurate positioning of the paper sheets, so the material cost and the equipment cost cannot be sufficiently lowered, and the production speed is relatively low.

To solve this problem, it is possible to form a light-shielding envelope by folding a single sheet of paper along a center line and close the opposite side to the folded side with a sealing tape. However, as the side-sealing tapes also serve as reinforcing tapes for preventing the light-shielding envelope from bending, providing the side-sealing tape only along one side can make the light-shielding envelope easy to bend while being inserted into the film holder, especially while being moved back into the film holder after the exposure.

OBJECT OF THE INVENTION

In view of the foregoing, a prime object of the present invention is to provide a sheet film package whose light-shielding envelope is inexpensive, easy to manufacture, and has a high stiffness in flexure.

SUMMARY OF THE INVENTION

To achieve the above object in a sheet film package containing a sheet film unit in a light-shielding envelope with an open end through which the sheet film unit is movable into and out of the light-shielding envelope, the present invention forms the light-shielding envelope by folding a sheet of light-tight material in half to provide a folded side, and securely sealing joints of the folded sheet along a side opposite to the folded side as well as in an end opposite to the open end, such that a middle portion of the folded side has a larger folding angle compared with end portions of the folded side.

Due to the large folding angle of the middle portion, the cross-sectional area increases in the middle of the light-shielding envelope compared with the opposite ends, so the bending stiffness of the middle portion is improved. Since the end portions have smaller folding angels and thus the envelope has correspondingly small cross-sectional areas in the ends, the envelope can be smoothly moved into and out of the film holder, and it is easy to seal the open end of the light-shielding envelope with the clip in a light-tight fashion. Also, the light-shielding envelope will not apply any extraneous load to the sheet film unit, so that the sheet film unit is stably contained in the light-shielding envelope, and can be smoothly moved into and out of the light-shielding envelope.

BRIEF DESCRIPTION OF THE DRAWINGS

Other objects and advantages of the present invention will become apparent in the following detailed description of the preferred embodiments when read in connection with the accompanying drawings. However, it should be understood that the detailed description and specific examples, while indicating preferred embodiments of the invention, are given by way of illustration only and thus are not limitative of the present invention. In the drawings, like reference numerals designates like or corresponding parts throughout the several views, and wherein.

DETAILED DESCRIPTION OF THE PREFERRED EMBODIMENTS

Figure 1:
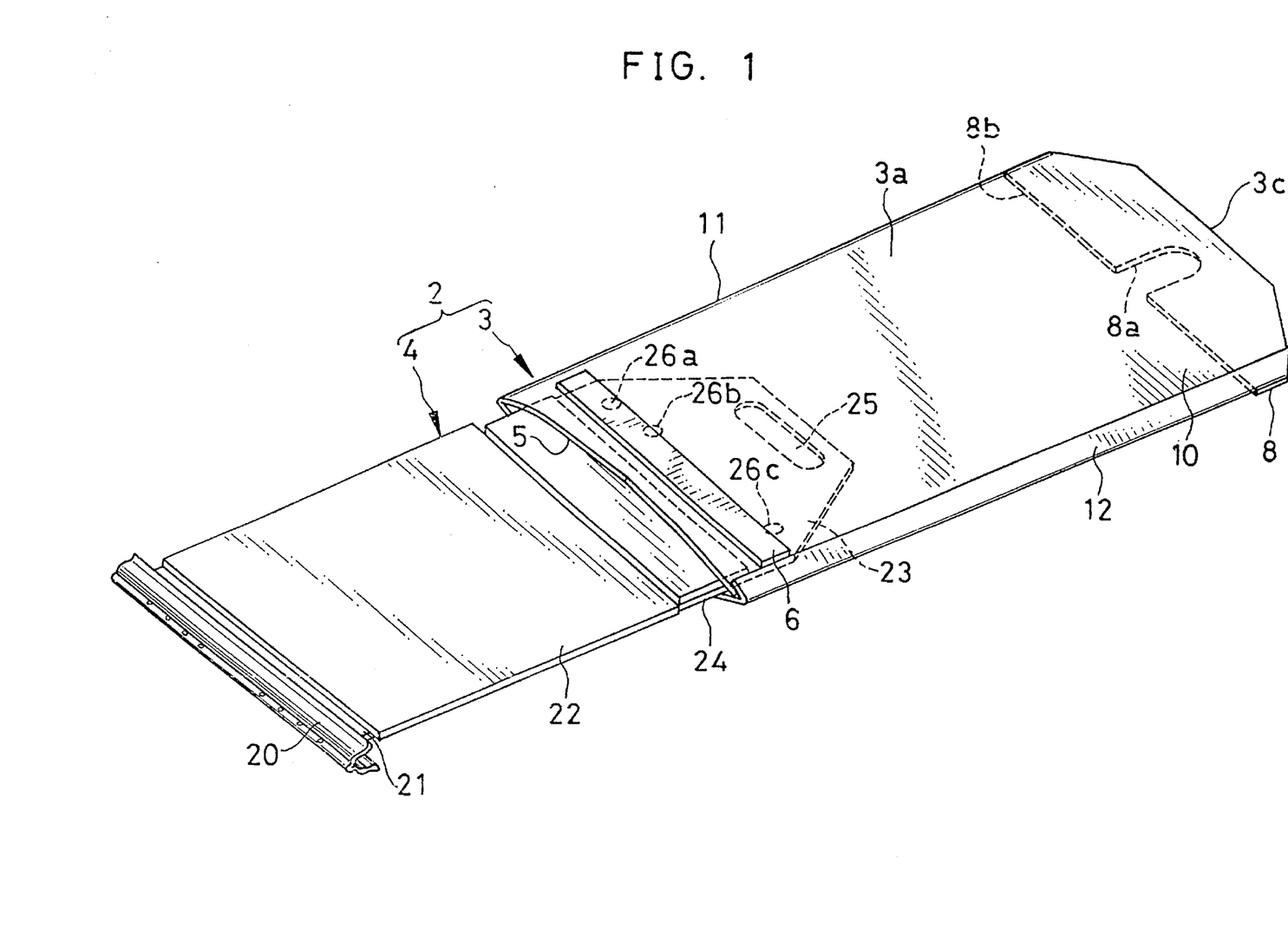
FIG. 1 is a perspective view of a sheet film package according to an embodiment of the invention, with a sheet film unit withdrawn from an light-shielding envelope.

FIG. 1 shows a sheet film package 2 according to a preferred embodiment of the invention, in a position where a sheet film unit 4 is pulled out from a light-shielding envelope 3. The light-shielding envelope 3 has an open end 5 for allowing the sheet film unit 4 to move into and out of the light-shielding envelope 3. A light-shielding clip 20 is provided along an end of the sheet film unit 4, for sealing the open end 5 of the light-shielding envelope 3 when the sheet film unit 4 is fully inserted in the light-shielding envelope 3.

Figure 2:
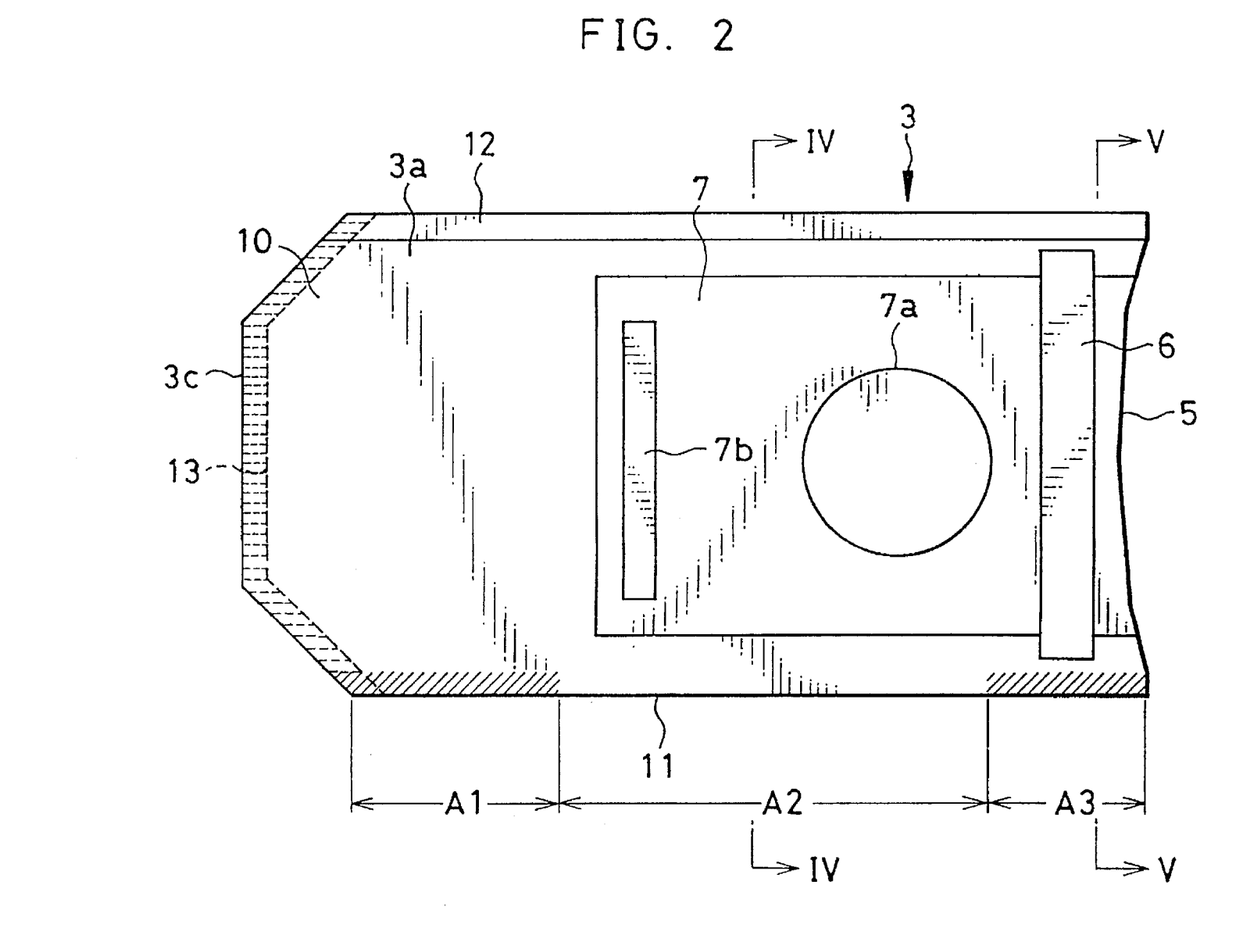
FIG. 2 is a top plan view of the light-shielding envelope of the sheet film package.

A stop plate 6 of hard cardboard is cemented to an outer surface 3a of the light-shielding envelope 3 proximate the open end 5. The outer surface 3a with the stop plate 6 is directed toward a taking lens of a camera when the sheet film package 2 is properly loaded in a film holder which is attached to the camera. Hereinafter, the outer surface 3a of the light-shielding envelope 3 will be referred to as the front surface 3a. The stop plate 6 is provided for engagement with a latching member of the film holder to stop the light-shielding envelope 3 from being farther withdrawn from the film holder. Thus, the light-shielding envelope 3 is prevented from slipping away from the film holder. The front surface 3a of the light-shielding envelope 3 has a printing area 7 as shown in FIG. 2, wherein an indicia 7a indicating that this side is to be directed toward the taking lens, and an indicia 7b indicating the film manufacturer, the film type and other film information are printed. The printing area 7 is omitted for clarity from FIG. 1.

As shown by dashed line in FIG. 1, a grip plate 8 of hard cardboard is cemented to a back surface 3b of the light-shielding envelope 3 in an end 3c opposite to the open end 5. The opposite end 3c is disposed outside the film holder when the sheet film package 2 is loaded therein, so that the photographer can handle the sheet film package 2 while pinching at the grip plate 8. A cut-out 8a is formed in a middle of the grip plate 8 so as to pinch the light-shielding envelope 3 directly. Hereinafter, the end 3c having the grip plate 8 will be referred to as a handling end.

Figure 3:
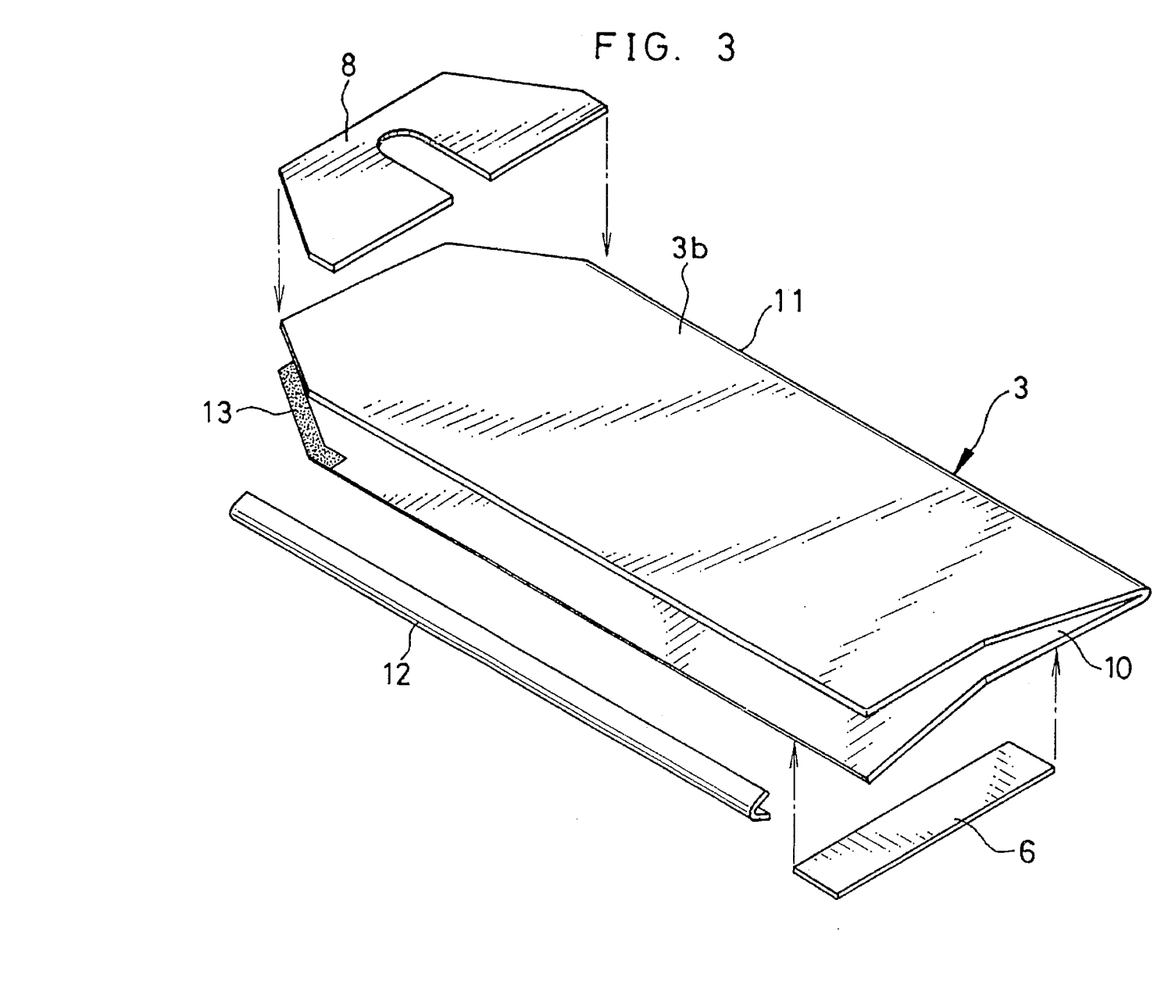
FIG. 3 is an exploded perspective view of the light-shielding envelope.

Referring to FIG. 3, the light-shielding envelope 3 is made of a sheet of light-tight material 10 folded in half. The folded side 11 forms a longitudinal edge of the light-shielding envelope 3, while the joint of the opposite side is secured with a side-sealing tape 12. The handling end 3c is sealed with an adhesive agent 13 such as a hot-setting adhesive agent.

Figure 4:
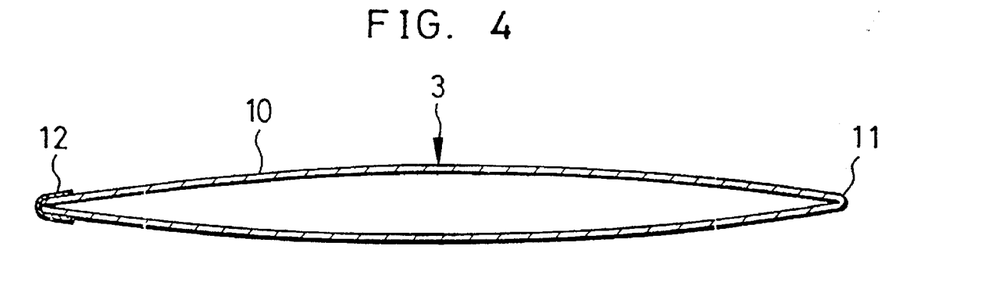
FIG. 4 is a cross-sectional view of the light-shielding envelope taken along a line IV—IV of FIG. 2.
Figure 5:
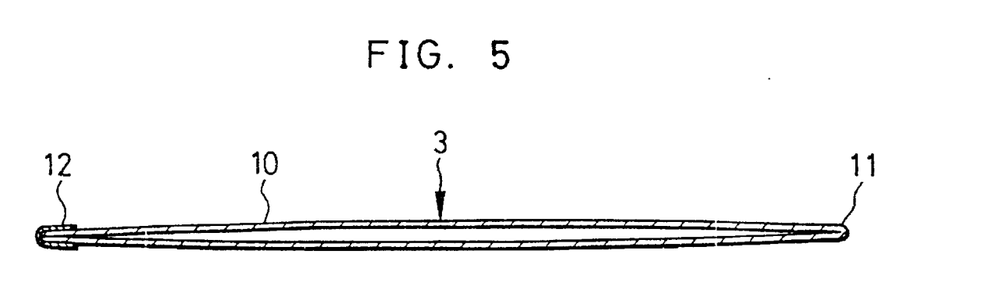
FIG. 5 is a cross-sectional view of the light-shielding envelope taken along a line V—V of FIG. 2.

The folded side 11 is pressed by a hot-press so as to have partly different folding angles. Specifically, a smaller pressure is applied to a middle portion A2 compared with end portions A1 and A3 which are indicated by hatching, so that the middle portion A2 has a larger folding angle than the end portions A1 and A3. Due to the large folding angle of the middle portion A2, the cross-sectional area increases in the middle of the light-shielding envelope 3 compared with the opposite ends, as shown in FIGS. 4 and 5, so the bending stiffness of the middle portion A2 is improved. Since the end portions A1 and A3 have smaller folding angles and thus the envelope 3 has correspondingly small cross-sectional areas in the ends 5 and 3c, it is easy to seal the open end 5 of the light-shielding envelope 3 with the clip 20 in a light-tight fashion, and the light-shielding envelope 3 can be smoothly moved into and out of the film holder. Also, the light-shielding envelope 3 will not apply any extraneous load to the sheet film unit, so that the sheet film unit is stably contained in the light-shielding envelope 3, and can be smoothly moved into and out of the light-shielding envelope 3.

Referring again to FIG. 1, a first base plate 21 is secured to the clip 20 by caulking. The first base plate 21 is removably connected to a first end of a photographic sheet film 22 through a hot-melt adhesive applied on a rear surface of the photographic sheet film 22. A second end of the photographic sheet film 22, which is opposite to the first end, is removably connected to a second base plate 23 through a hot-melt adhesive applied on the rear surface of the photographic sheet film 22. Side edges of the second base plate 23 are cut diagonally so as to taper off to a free end, so that the sheet film unit 4 can smoothly thrust into the light-shielding envelope 3. A plate 24 is securely put on the second base plate 23 so as to offset the step between the photographic sheet film 22 and the second base plate 23.

A lateral slot 25 and three round holes 26a, 26b and 26c are formed through the second base plate 23. The slot 25 allows the opposite walls of the light-shielding envelope 3 to come into contact with each other when the light-shielding envelope 3 is pinched in the cut-out 8a of the grip plate 8. Accordingly, it is possible to draw out the sheet film unit 4 along with the light-shielding envelope 3 from the film holder, while keeping the sheet film unit 4 in the same position relative to the light-shielding envelope 3. The round holes 26a to 26c are aligned in a lateral direction of the sheet film unit 4, but are spaced differently from one another. The round holes 26a to 26c are provided for discrimination between the back surface and the photosensitive surface of the sheet film unit 4. In the factory, the spacings between the round holes 26a to 26c are checked for prevention of reverse insertion of the sheet film unit 4 into the light-shielding envelope 3.

Figure 6:
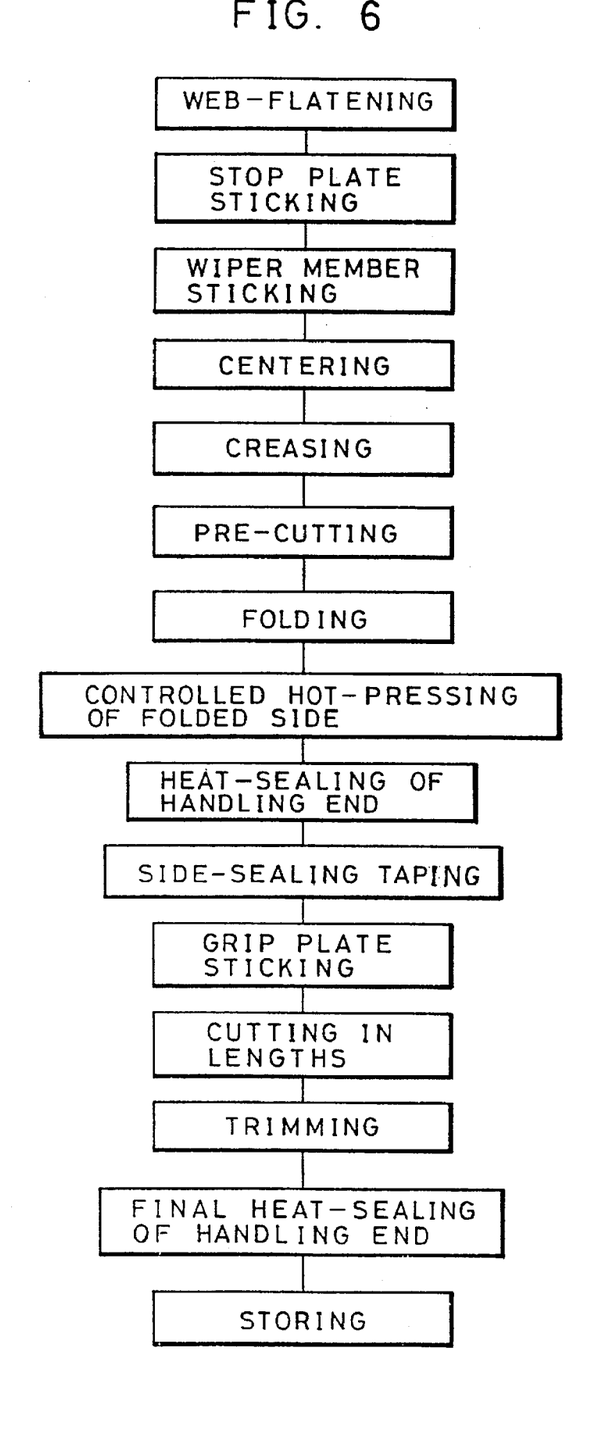
FIG. 6 is a flow chart illustrating a sequence of manufacturing the light-shielding envelope.

FIG. 6 shows a sequence of manufacturing the light-shielding envelope 3. First, a continuous web 10 of a light-tight sheet material is withdrawn from a roll, and is flattened. Next, the stop plate 6 is attached to one surface of the continuous web 10 at each assigned position. Also wiper members such as felt ribbons are cemented to the opposite surface of the continuous web 10 at given positions, though the wiper members are not shown in the drawings. The wiper members are provided for wiping the dust off the photographic sheet film 22. Thereafter, a longitudinal center line of the continuous web 10 is aligned with a predetermined line to crease the continuous web 10 along the center line. The continuous web 10 is cut halfway along transversal lines, i.e. from one side edge to the center line, at regular intervals, and then folded according to the crease of the center line.

Next, the continuous web 10 is hot-pressed along the folded side so as to adjust the folding angle to the above-described configuration of the individual light-shielding envelope 3. The folded continuous web 10 is then hot-sealed in those areas which are to be shaped into the handling ends 3c of the light-shielding envelopes 3. Thereafter, the side-sealing tape 12 is put on aligned longitudinal edges of the folded continuous web 10 to securely join the edges to each other. After the grip plate 8 is secured to a designated position of the folded continuous web 10, the continuous web 10 is cut at designated positions into predetermined lengths. Each cut piece is then trimmed into the shape of the light-shielding envelope 3. Finally, the handling end 3b of the light-shielding envelope 3 is hot-pressed again to ensure the sealing. The complete light-shielding envelope 3 is stored in a stack.

Figure 7:
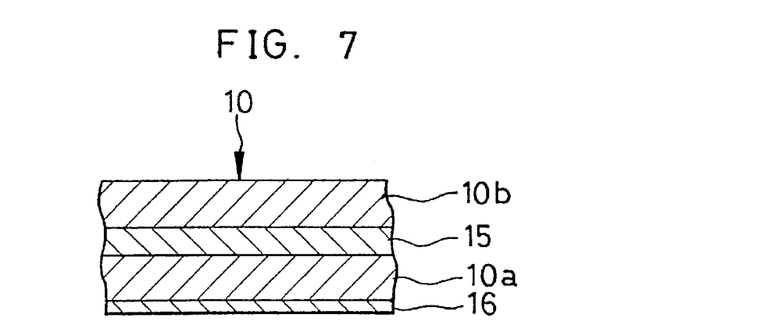
FIG. 7 is a sectional view illustrating a laminated structure of a light-tight sheet as a material of the light-shielding envelope according to an embodiment of the invention.

The light-tight sheet 10 is a laminated sheet consisting of four layers, as shown in FIG. 7. That is, a polyolefin-group thermoplastic resin sheet, e.g., a polyethylene sheet 15 is sandwiched between carbon-black mixed paper sheets 10a and 10b by extrusion laminating. This construction improves the stiffness of the light-shielding envelope 3 and restrains the light-shielding envelope 3 from curling, in comparison with the conventional envelope made of light-shielding paper which is coated with resin merely on one surface. The longitudinal strain of the paper sheets 10a and 10b responsive to the temperature variation and the humidity variation should be approximately equal to each other, so as to prevent a curl or crook of the laminated sheet material 10 and thus the light-shielding envelope 3. The outer surface of the paper sheet 10a is coated with wax of 1 g/m$^2$ thick as a lubricant layer 16. The light-tight sheet 10 should be folded with the lubricant layer 16 inside, so that the sheet film unit 4 may be smoothly moved into and out of the light-shielding envelope 3 and may not be scratched by the light-shielding envelope 3.

The light-tight sheet 10 can also be formed by dry laminating or wet laminating. As the thermoplastic resin, various kinds of polyolefin resin including monopolymer-resin, copolymer-resin and mixture of different resins may be applicable.

The weight of the paper sheets 10a and 10b is preferably in a range from 60 g/m$^2$ to 120 g/m$^2$. Below this range, the stiffness in flexure of the light-shielding envelope 3 is insufficient so that the sheet film package 2 is apt to bend. Above this range, it is hard to achieve smooth movement of the light-shielding envelope 3 into and out of the film holder. According to the present invention, the paper sheets 10a and 10b are 90 g/m$^2$ in weight. Carbon black is loaded in the paper sheets 10a and 10b so as to restrain reflection on the outer surface of the light-shielding envelope 3 and shield light from the interior of the light-shielding envelope 3. The density of the carbon black in the paper sheets 10a and 10b is preferably 2 wt % to 15 wt % (1.2 g/m$^2$ to 18 g/m$^2$). Mixing black dye such as cationic dye in addition to the carbon black will improve the light-shielding properties of the light-shielding envelope 3.

Although the paper sheets 10a and 10b must be colored for anti-reflection on the outer surfaces of the light-shielding envelope 3, the paper sheets 10a and 10b need not sufficiently absorb or reduce light by themselves. That is, the polyethylene sheet 15 may contain carbon black so as to have light-shielding properties. Thus, ambient light is completely shielded from the light-shielding envelope 3 interior by the combination of the respective layers having light-shielding properties. In this case, the polyethylene sheet 15 preferably contains the carbon black at a density from 0.5 wt % to 10 wt %. According to this configuration, the interior of the light-shielding envelope 3 is shielded from light even if it is left under 100,000 lux light for ten minutes.

The thickness of the polyethylene sheet 15 is preferably in a range from 10 μm, to 70 μm, that corresponds a weight range from 10 g/m$^2$ to 70 g/m$^2$. Below this range, it is difficult to reliably form the polyethylene sheet 15 by laminating, so the laminated layers tend to be separated from each other. Above this range, the light-tight sheet 10 is not suitable to form by laminating, but rising material cost. The polyethylene sheet 15 of the above mentioned thickness range provides the light-shielding envelope 3 with a satisfactory moisture-proofness. To improve the moisture-proofness of the light-shielding envelope 3, it is possible to use waterproof paper as the paper sheets 10a and 10b. Impregnating the paper sheets 10a and 10b with a resin may be preferable for improving stiffness in flexure and water-proof properties of the light-shielding envelope 3.

The above described sheet film package 2 operates as follows:

Before use, the open end 5 of the light-shielding envelope 3 of the sheet film package 2 is closed by the light-shielding clip 20 in a light-tight fashion, as shown in FIG. 1. For exposure, the sheet film package 2 is loaded in a film holder attached to a rear side of a camera. When loading the sheet film package 2, a lock lever of the film holder is set in a releasing position, and then the sheet film package 2 is inserted in the film holder with the clip 20 located in the innermost position of the film holder. Thereafter when the lock leer is set in a locking position, the clip 20 is arrested in the innermost position, and the light-shielding envelope 3 is allowed to separate from the clip 20. Most portion of the light-shielding envelope 3 is then withdrawn from the film holder to leave the sheet film in an exposure position behind an exposure frame of the camera.

As the light-shielding envelope 3 is coated with wax on its inner surface, separation of the light-shielding envelope 3 from the sheet film unit 4 can be done smoothly without the photographic sheet film 22 being scratched by the light-shielding envelope 3.

After the exposure of the photographic sheet film 22, the light-shielding envelope 3 is moved back into the film holder so as to insert the exposed sheet film unit 4 therein. Because of the relatively large folding angle of the middle area A2 of the folded side 11, the light-shielding envelope 3 has an improved stiffness in flexure, so the light-shielding envelope 3 is hardly bent while being pushed back into the film holder. On the other hand, because of the relatively small folding angle of the end area A3, the margins of the open end 5 is smoothly guided into the clip 20.

By resetting the lock lever to the releasing position, the clip 20 clamps the margins of the open end 5 to seal the light-shielding envelope 3 again. Since the slot 25 of the sheet film unit 4 is located under the cut-out 8a in this position, the sheet film unit 4 and the light-shielding envelope 3 are together removed from the film holder by pulled out the light-shielding envelope 3 while tightly pinching at the cut-out 8a. After the sheet film package 2 is removed from the film holder, the light-shielding envelope 3 is folded along a border 8b of the grip 8, so as to fix the position of the sheet film unit 4 in the light-shielding envelope 3 and thus secure the clip 20 to the light-shielding envelope 3.

Figure 8:
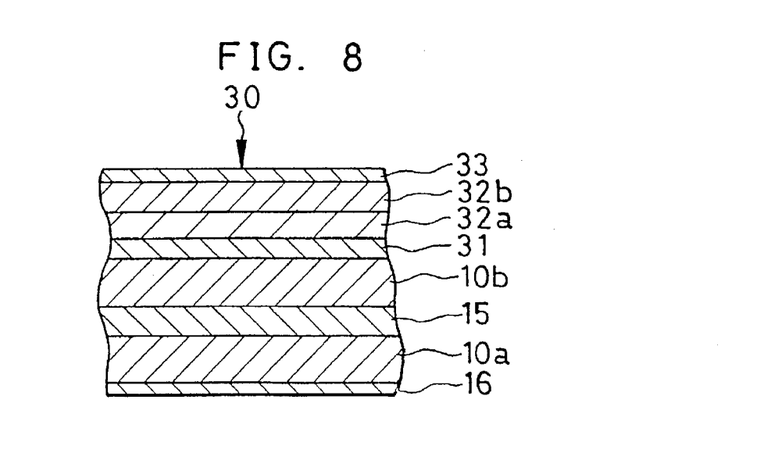
FIG. 8 is a sectional view illustrating a laminated structure of the light-tight sheet according to another embodiment of the invention.

FIG. 8 shows a lamination structure of another light-tight sheet or web 30 as a material of the light-shielding envelope 3. According to this embodiment, an ink layer 31 is formed by printing on a paper layer 10b, and two layers of curing agent lacquer 32a and 32b are formed on the ink layer 31 by coating with a curing lacquer twice. Furthermore, a lubricant layer 33 is formed on the outer curing agent layer 32b. The lubricant layer 33 is to be disposed in the outermost position of the light-shielding envelope 3. The same laminations as the light-tight sheet 10 has are designated by the same reference numbers as used in FIG. 7. The major components of the curing agent lacquer of the layers 32a and 32b may be shown in Table 1, and a curing agent consisting of 100% xylene-di-isocyanate (XDI) is loaded in a ratio of 5% to the major components. The lubricant layer 33 may have a composition as shown in Table 2.

TABLE 1

| COMPOSITION | RATIO |
|---|---|
| aklyl-polyol | 36.8% |
| vinyl-chloride-acetate | 36.8% |
| cellulose-acetyl-butylate (CAB) | 4.2% |
| polyethylene wax | 7.4% |
| silica | 14.8% |

TABLE 2

| COMPOSITION | RATIO |
|---|---|
| polyamide | 8.2% |
| nitro-cellulose | 73.8% |
| erucic-acid-amide | 16.4% |
| silica | 1.6% |

Table 3 shows results of experiments on bending stiffness and appearance change of light-shielding envelopes made of different kinds of light-tight sheets. Each light-shielding envelope was formed by folding a sheet at a uniform folding angle, i.e., under a uniform pressure.

TABLE 3

| | EXAMPLE | | | | |
|---|---|---|---|---|---|
| | 1 | 2 | 3 | 4 | 5 |
| | BASIC MATERIAL + LUBRICANT LAYER × 1 | BASIC MATERIAL + LUBRICANT LAYER × 2 | BASIC MATERIAL + CURING LAYER × 1 | BASIC MATERIAL + CURING LAYER × 2 | BASIC MATERIAL + CURING LAYER × 2 + LUBRICANT LAYER × 1 |
| LAMINATIONS | | | | | |
| BENDING STIFFNESS | E | D | D | B | B |
| APPEARACE CHANGE | E | A | A | E | A |
| CONCLUSION | E | E | E | E | B |

In Table 3, "basic material" has the laminated structure as shown in FIG. 7, wherein a polyolefin-group thermoplastic resin sheet, e.g., a polyethylene sheet is sandwiched between carbon-black mixed paper sheets; and "A", "B", "D" and "E" respectively represent the grades "excellent", "good", "unsatisfactory" and "ineffective in practice". It is to be noted that the respective layers were 0.5 to 3 μm thick per coat.

As shown in Table 3, example-1 with a single layer of conventional lubricant wax lacks bending stiffness, and paper-fiber tore along the folded side. Both example-2 with two layers of the conventional lubricant wax, and example-3 with a single layer of curing lacquer which contains 5 parts of xylene-di-isocyanate to 100 parts of the major components as shown in Table 1, did not suffer any paper-fiber tear, but they were insufficient in bending stiffness. Example 4 with two layers of the curing lacquer was sufficient in bending stiffness, but the curing lacquer layers tore along the folded side. Example-5, as having the lamination structure according the embodiment shown in FIG. 8, was sufficient in bending stiffness, and no tear was found in the paper fiber and the curing lacquer layers.

Table 4 shows test results on light-shielding properties and working properties (i.e. frequency of bending in this instance) of those light-shielding envelopes which have the same configuration as the light-shielding envelope 3, but differ from one another in length ratio between the middle portion A2 and the end portions A1 and A3 of the folded side 11, wherein the end portions A1 and A3 have an equal length in each example. The examples were made of both the light-tight sheet 10 and the light-tight sheet 30 for each length ratio.

TABLE 4

| LENGTH RATIO (%) | | | LIGHT-SHIELDING PROPERTIES | WORKING PROPERTIES | |
|---|---|---|---|---|---|
| A1 : | A2 : | A3 | | WEB 10 | WEB 30 |
| 0 | 100 | 0 | E | A | A |
| 5 | 90 | 5 | D | A | A |
| 7 | 86 | 7 | C | A | A |
| 10 | 80 | 10 | B | B | A |
| 15 | 70 | 15 | B | B | A |
| 20 | 60 | 20 | B | B | A |
| 25 | 50 | 25 | B | C | A |
| 30 | 40 | 30 | A | C–D | C |
| 40 | 20 | 40 | A | D | C–D |
| 50 | 0 | 50 | A | E | D–E |

In Table 4, "A" represents excellent light-shielding properties or indicates that the light-shielding envelope can be rapidly and smoothly moved into the film holder; "B" represents good light-shielding properties or indicates that the light-shielding envelope can be smoothly moved into the film holder; "C" represents adequate light-shielding properties or indicates that the light-shielding envelope can be slowly moved into the film holder; "D" represents unsatisfactory light-shielding properties or indicates that the light-shielding envelope was not smoothly moved into the film holder or sometimes loaded in an improper position; and "E" indicates that the light-shielding properties were ineffective in practice or that the light-shielding envelope was difficult to insert into the film holder and often loaded in an improper position.

As shown in Table 4, reasonable light-shielding properties and working properties were obtained where the length ratio of the middle portion A2 to the entire length of the folded side 11 was 40% to 86%. With increasing length ratio of the middle portion A2, the working properties were improved or the frequency of bending of the light-shielding envelope 3 was reduced. But too large length ratios of the middle portion A2 lowered the light-shielding properties. The improved light-tight sheet or web 30 as having the curing lacquer layers 32a and 32b made it possible to improve the working properties in a range of the length ratio A2:A1 or A3 wherein satisfactory light-shielding properties can be achieved. In any length ratio, production cost of the light-shielding envelope 3 formed by folding a sheet in half was remarkable reduced compared with the conventional light-shielding envelopes made by joining two sheets together with side-sealing tapes on both sides of the sheets.

Although controlled hot-pressing for changing the folding angles of the portions A1, A2 and A3 is executed in the last stage of the folding process in FIG. 6, it is alternatively possible to execute the controlled hot-pressing in the last step of manufacturing the light-shielding envelope 3, or provide a separate process for adjusting the folding angle. To control the pressure on the folded side 11, a pressure mold having a corresponding contour or a series of press rollers applying different pressures may be applicable.

Although the same pressure is applied to within the same portion A1, A2 or A3 in the above-described embodiment, it is possible to gradually change the pressure around the borders between the portions A1, A2 and A3. In that case, a pressure mold for the folded side 11 should have correspondingly gradually changed contour. This embodiment effectively prevents integration of bending stress in the borders between the differently pressed portions A1, A2 and A3, and thus still more improves the bending stiffness of the light-shielding envelope 3.

The sequence of manufacturing of the light-shielding envelope 3 may not be limited to the embodiment shown in FIG. 6. The layers of curing agent embodiment shown in FIG. 6. The layers of curing agenct lacquer 32a and 32b and the lubricant layer 33 may be formed on inside of the envelope 3.

Meanwhile, in the photographic film package as above, if the open end of the light-shielding envelope is not properly fitted into the clip when the envelope is moved back into the sheet holder of the camera after the exposure of the photographic sheet film, a gap is provided between the open end and the clip. As a result, the exposed sheet film could be unexpectedly exposed to ambient light. To solve this problem, the present Applicant has suggested forming light-shielding ridges or waves in proximity to the open end of the envelope in U.S. application Ser. No. 07/014,680. Although the ridges improve light-shielding properties of the envelope in a closed position with the clip, inside surfaces of the ridges protruding inwardly of the envelope give a certain contact pressure to the photographic sheet fill, and may scratch the sheet film.

Another problem would arise when such light-shielding ridges are to be formed on such an envelope that is formed by folding a sheet in half, as is shown in FIG. 3. Because the thickness of that envelope is different between the folded side and the sealed side due to the thickness of a sealing device such as a side-sealing tape, the amount of projection of a ridge disposed on the sealed side would be more than that of a ridge disposed on the folded side, and the inside surface of the ridge on the sealed side would rub against the film sheet, so that the film sheet is more likely to be scratched by that ridge.

Figure 9:
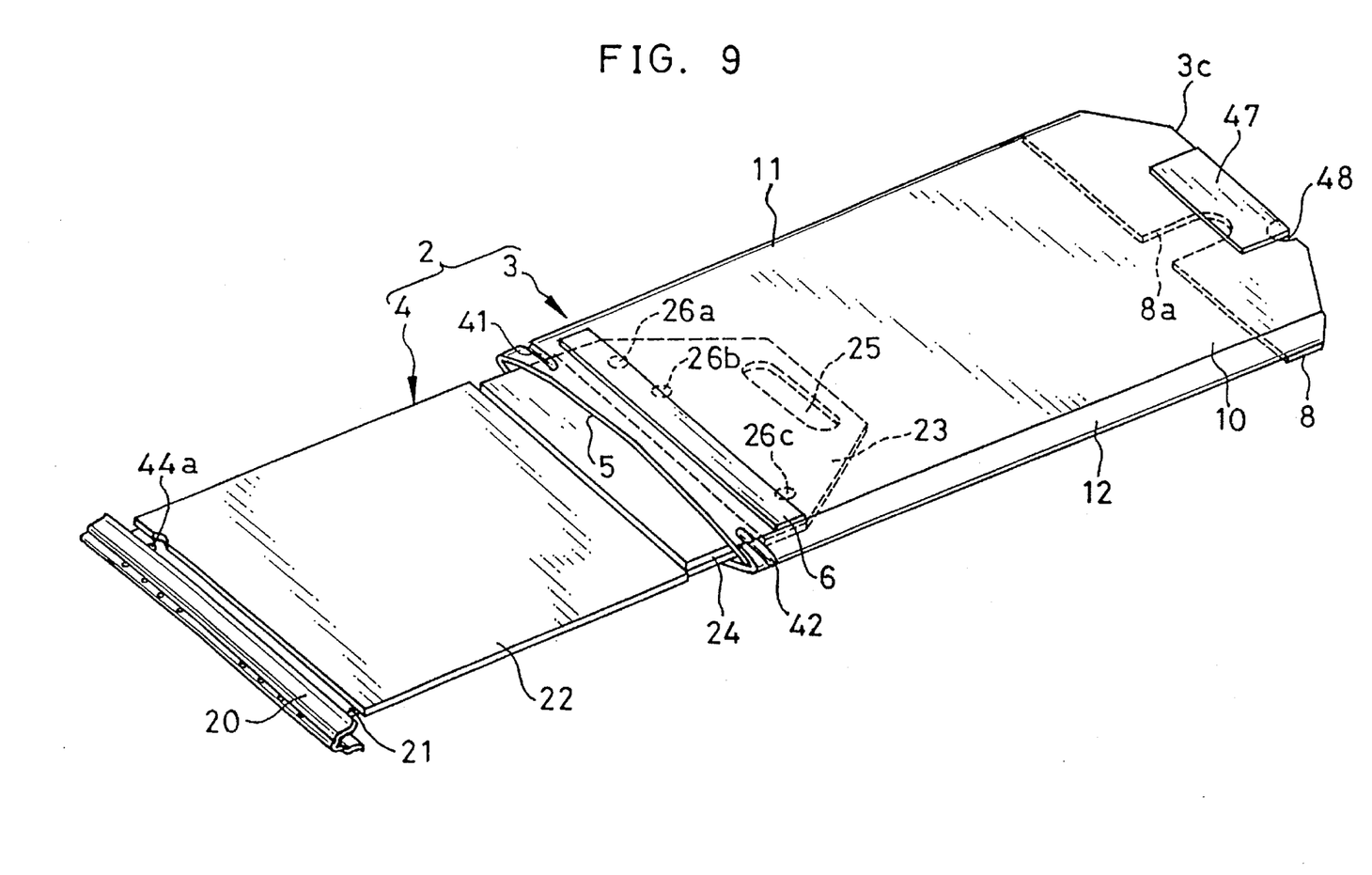
FIG. 9 is a perspective view, partly cut way, of a sheet film package according to another embodiment of the invention, with a sheet film unit withdrawn from a light-shielding envelope.

According to a second preferred embodiment of the invention, as shown in FIG. 9, a light-shielding envelope 3 of a sheet film package 2 is provided with a pair of ridges or waves 41 and 42 in proximity to an open end 5 thereof. It is to be noted that the sheet film package 2 according to the embodiment shown in FIG. 9 has fundamentally the same configuration as the first embodiment. Therefore, equivalent elements are designated by the same reference numerals, so that the following description will be related merely to essential elements for the second embodiment.

Figure 10:
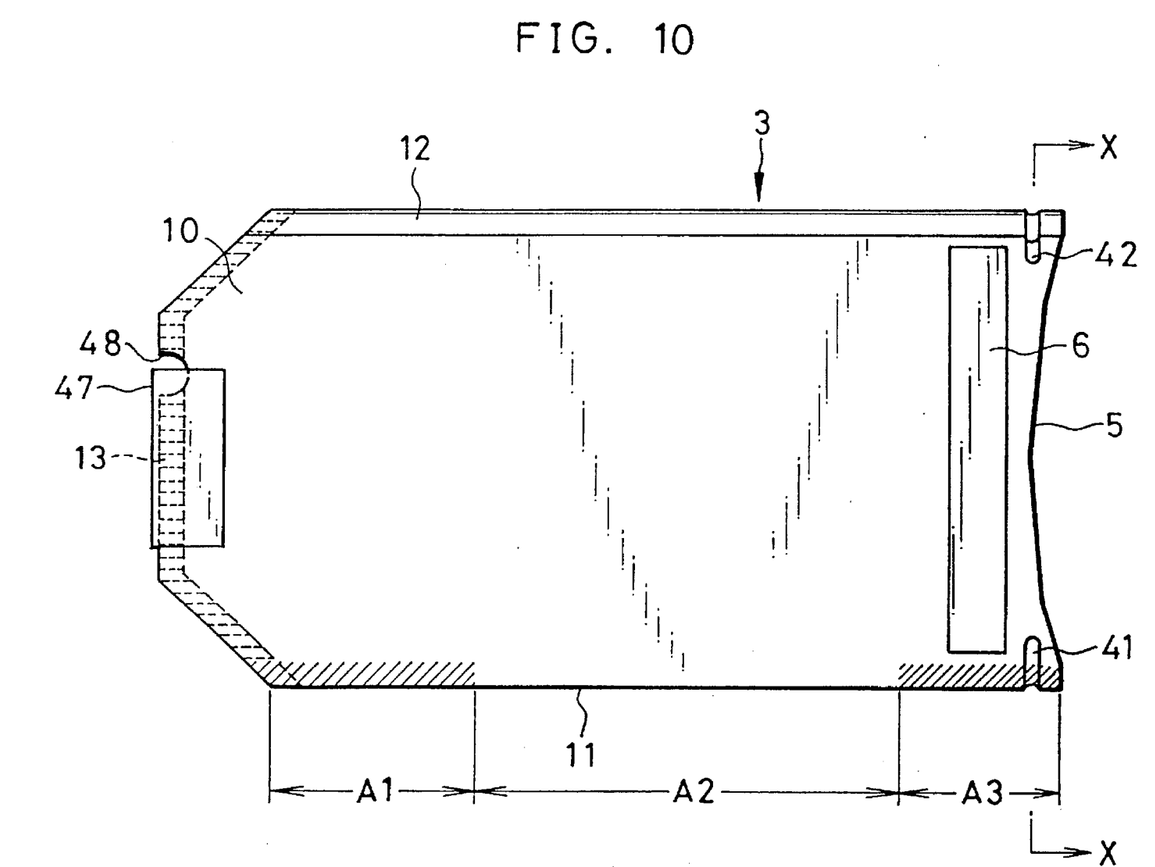
FIG. 10 is a top plan view of the light-shielding envelope of the sheet film package shown in FIG. 9.

The ridges 41 and 42 extend in a direction traversing the path of a sheet film unit 4 movable into or out of the light-shielding envelope 3 through an open end 5. In the embodiment shown in FIG. 10, the ridges 41 and 42 extend substantially in parallel to the open end 5 of the light-shielding envelope 3. As set forth in detail below, the ridges 41 and 42 are semi-cylindrical or arc-shaped in traverse sections thereof, i.e., in the sections along the moving path of the sheet film unit 4. In this way, a photographic sheet film 22 of the sheet film unit 4 is prevented from being scratched by the ridges 41 and 42 while the sheet film unit 4 is being moved relative to the light-shielding envelope 3.

Also in the second embodiment, the light-shielding envelope 3 is formed by folding a sheet of light-tight material 10 in half, in the same way as shown in FIG. 3, and a folded side 11 is hot-pressed so as to have partly different folding angles. Specifically, a smaller pressure is applied to a middle portion A2 compared with end portions A1 and A3 which are indicated by hatching, so that the middle portion A2 has a larger folding angle than the end portions A1 and A3. The light-tight material 10 may have the same lamination structure as described above with reference to FIG. 7 or 8.

A hole 44 formed through a first base plate 21 is biased toward one side of the sheet film unit 4, so as to permit discriminating between obverse and reverse surfaces of the photographic sheet film 22. Furthermore, an adhesive tape 47 is removably attached to a handing end 3c of the light-shielding envelope 3 besides a grip plate 8. The adhesive tape 47 is used for securing the light-shielding envelope 3 to a clip 20 after the exposure of a photographic sheet film 22 of the sheet film unit 4. A cut-out 48 for facilitating removal of the adhesive tape 47 is formed through the handing end 3c of the light-shielding envelope 3 and the grip plate 8, such that an edge of the adhesive tape 47 overlaps with the cut-out 48.

The ridges 41 and 42 may be formed simultaneously with the trimming step or the final heat-sealing step in the manufacturing process of the light-shielding envelope 3 such as shown in FIG. 6. Of course, it is possible to form the ridges 41 and 42 in another stage of the manufacturing process, and separately from the other steps.

Figure 11:
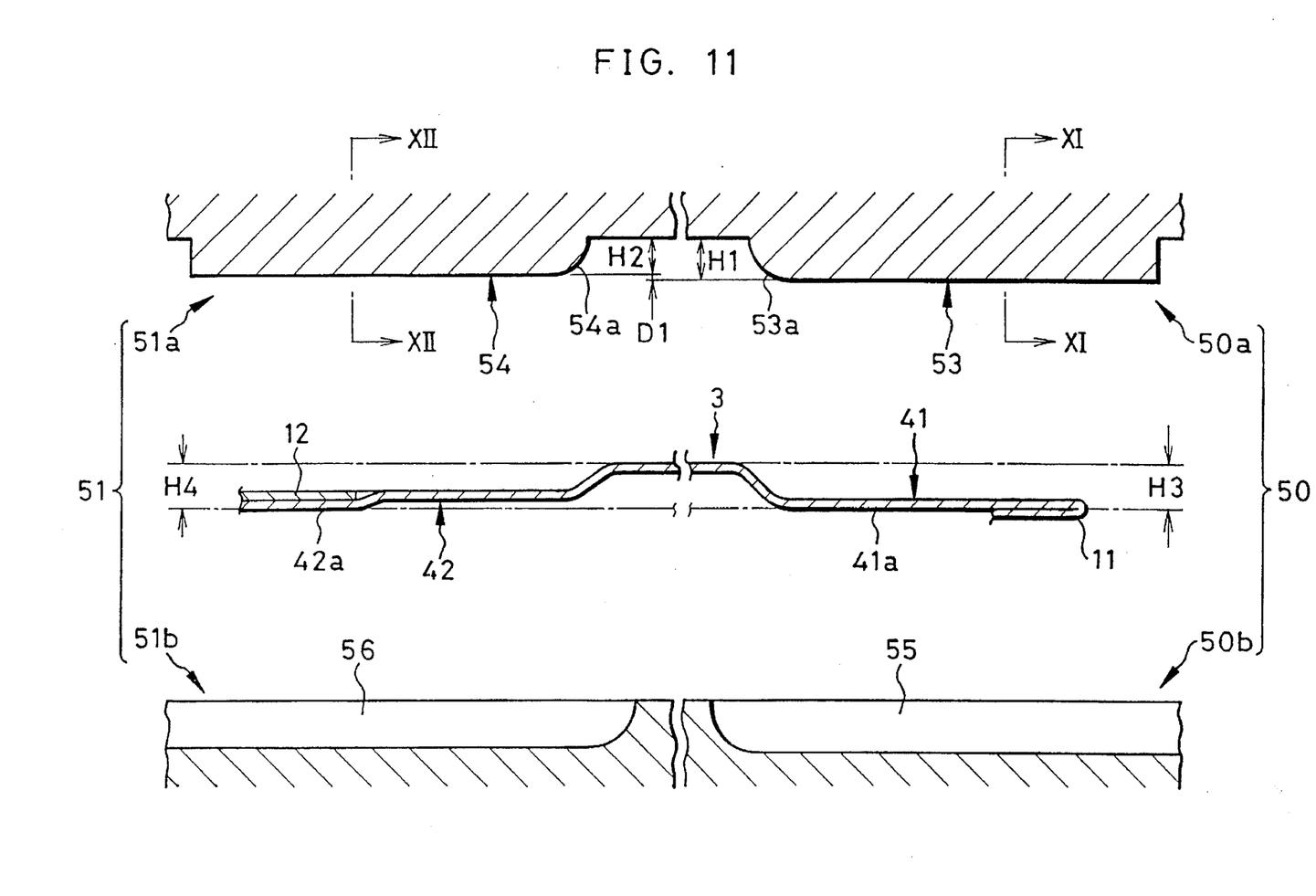
FIG. 11 is an explanatory sectional view of the light-shielding envelope taken along a line X—X of FIG. 10, in connection with two pairs of embossing dies for forming ridges of the light-shielding envelope.

As shown in FIG. 11, the ridges 41 and 42 may be formed by embossing the light-shielding envelope 3 by use of two pairs of embossing dies 50 and 51. The embossing dies 50 and 51 may be formed separately or as a unit. Each of the embossing dies 50 and 51 is constituted of a male die 50a or 51a and a female die 50b or 51b. The male dies 50a and 51a have protrusions 53 and 54, respectively. The female dies 50b and 51b have cavities 55 and 56 as counterparts of the protrusions 53 and 54, respectively.

Figure 12:
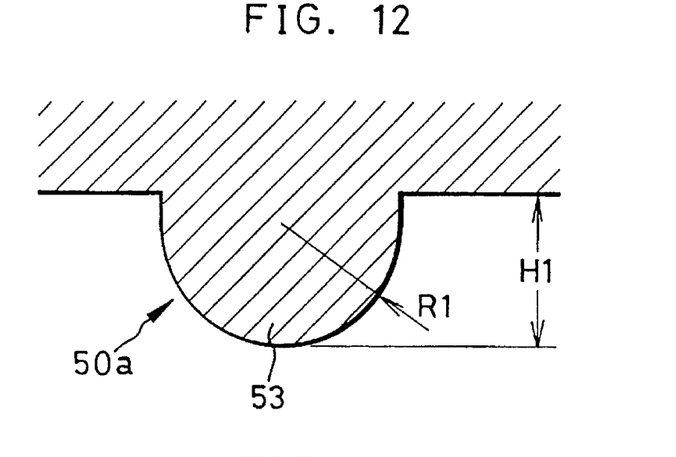
FIG. 12 is a cross-sectional view of a convex piece of a male die of one die set, taken along a line XI—XI of FIG. 11.
Figure 13:
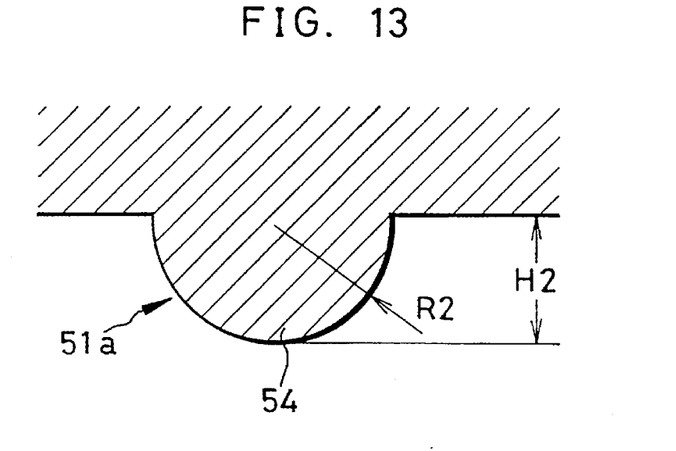
FIG. 13 is a cross-sectional view of a convex piece of a male die of the other die set, taken along a line XII—XII of FIG. 11.
Figure 14:
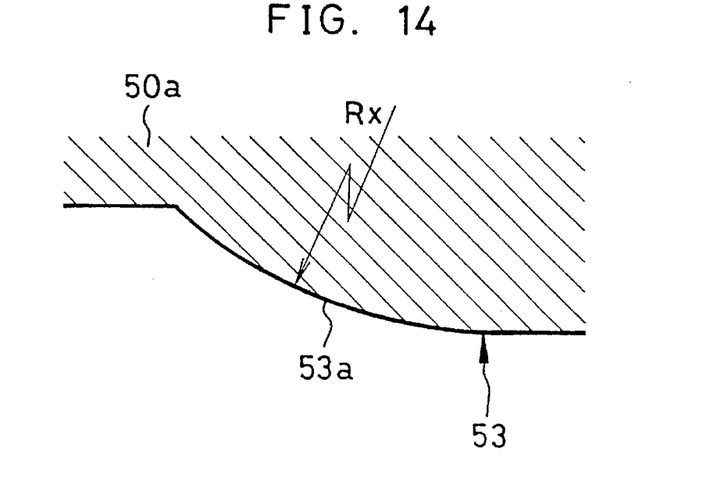
FIG. 14 is an enlarged sectional view illustrating a rounded internal terminal of the convex piece of the male die.

The protrusions 53 and 54 have substantially the same shapes as the ridges 41 and 42, respectively, and are thus semi-circular in transverse sections thereof, as shown respectively in FIGS. 12 and 13. Also, internal terminals 53a and 54a of the protrusions 53 and 54, which are oriented toward a longitudinal center line of the light-shielding envelope 3, are rounded with a radius of curvature Rx, as shown with respect to the protrusion 53 in FIG. 14.

The protrusion 53, which is used for forming the ridge 41 on the folded side 11 of the light-shielding envelope 3, has a height H1 slightly greater than the height H2 of the protrusion 54 which is used for forming the ridge 42 on the opposite side that is sealed with a side-sealing tape 12. The different D1 between the heights H1 and H2 is determined considering the thickness of the side-sealing tape 12, as set forth in detail below. If the protrusions 53 and 54 have the same height, an inside convex surface 42a of the ridge 42 on the sealed side would protrude more than an inside convex surface 41a of the ridge 41 on the folded side 11 due to the thickness of the side-sealing tape 12 that remains after the embossing.

Assuming that the side-sealing tape 12 is 90 μm thick, the side-sealing tape 12 as being put on both surfaces of the envelope 3 increases the thickness of the envelope 3 on the sealed side by 90×2=180 μm compared with the folded side 11. As a result of embossing, the thickness is reduced by 80 μm. Accordingly, 180−80=100 μm should be determined as the difference D1, so that the maximum heights or maximum amounts of projection H3 and H4 of the inside convex surfaces 41a and 42a of the ridges 41 and 42, i.e., may have the same value. In this way, contact pressures applied from the ridges 41 and 42 onto the photographic sheet film 22 are equalized and dispersed through the whole inside convex surfaces 41a and 42a, so that scratching of the photographic sheet film 22 is effectively prevented.

When the light-shielding envelope 3 is 110.8 mm×240 mm in size, the ridges 41 and 42 preferably have a length of 8–15 mm, and a height of 0.2 mm to 1.0 mm. To form the ridges 41 and 42 with the length of 12 mm and the heights H3 and H4 of 0.4 mm, it is preferable to determine that the height H1 of the embossing protrusion 53 is 0.7 mm, and the radius of curvature R1 of its section is 0.5 mm, whereas the height H2 of the embossing protrusion 54 is 0.6 mm, and the radius of curvature R2 of its section is 0.5 mm.

Also the radius of curvature Rx of the internal terminals 53a and 54a of the protrusions 53 and 54 is an important element for the contact pressure of the ridges 41 and 42 to the photographic sheet film 22. If the value Rx is too small, the consequent ridges 41 and 42 could not uniformly contact the photographic sheet film 22, so that the contact pressure would be partly increased, and the occurrence of scratches on the photographic sheet film 22 could be increased. However, as the ridges 41 and 42 have a small length of 8–15 mm, too large radius of curvature Rx would lower the light-shielding effect of the ridges 41 and 42. Therefore, the radius of curvature Rx should be determined so that the contact pressure of the ridges 41 and 42 onto the photographic sheet film 22 may be sufficiently small and uniform enough to prevent scratching the photographic sheet film 22, while maintaining a sufficient light-shielding effect of the ridges 41 and 42.

Table 5 shows test results of an experiment on occurrence of scratches on the photographic sheet film 22 and the light-shielding effect of the ridges 41 and 42, while changing radius of curvature Rx of the internal terminals 53a and 54a of the protrusions 53 and 54 of the male dies 50a and 51a. The length of the ridges 41 and 42 was set at 12 mm, and the radii of curvature R1 and R2 of the protrusions 53 and 54 were 0.5 mm.

TABLE 5

| Radius of Curvature Rx (mm) | Occurrence of Scratch | Light-Shielding Effect | Total Evaluation |
| --- | --- | --- | --- |
| 0.7 | E | A | E |
| 18.0 | E | A | E |
| 20.0 | D | A | D |
| 22.0 | C | A | B |
| 24.0 | B | B | B |
| 26.0 | B | B | B |
| 28.0 | B | B | B |
| 30.0 | A | C | B |
| 32.0 | A | D | D |
| 34.0 | A | E | E |

In Table 5, "A" represents very good; "B" represents good; "C" represents satisfactory for practice; "D" represents unsatisfactory and that an improvement is needed; and "E" represents that it is impossible to use in practice.

According to the results shown in Table 5, the radius of curvature Rx is preferably set in a range from 22 mm to 30 mm, and more preferably from 24 mm to 28 mm, when the length of the ridges 41 and 42 is 8–15 mm, and the radii of curvature R1 and R2 of the protrusions 51 and 52 are both 0.5 mm.

Although the ridges 41 and 42 extend substantially in parallel with the open end 5 of the light-shielding envelope 3 in the above embodiment, it is possible to arrange the ridges diagonally to the open end 5. This arrangement is effective to disperse resistance of the ridges against the clip 20, and thus facilitates fitting of the clip 20 to the light-shielding envelope 3. It is also possible to form more than two ridges on the light-shielding envelope 3.

The ridges 41 and 42 may be formed by use of pressing rollers or the like instead of the embossing dies 50 and 51. At that time, depressing amount of the pressing roller is gradually reduced in proximity to the internal terminal of the ridge so as to form a gently curved surface of the internal terminal.

The ridges 41 and 42 according to the present invention are effective for improving light shielding properties of a light-shielding envelope that is formed by mating a pair of sheets and joining both sides with side-sealing tapes. In this case, the protrusions of the male dies of the embossing dies may have the same height.

Thus, the present invention should not be limited by the above-described embodiments but, on the contrary, various changes and modifications of the present invention can be effected by those skilled in the art without departing from the scope and spirit of the appended claims.

What is claimed is:

1. In a sheet film package comprising a light-shielding envelope having an open end, and a sheet film unit movable into and out of said light-shielding envelope through said open end, said sheet film unit comprising a sheet of photographic film and a clip for openably sealing said open end of said light-shielding envelope in a light-tight fashion when said sheet film unit is contained in said light-shielding envelope, the improvement wherein:

ridges are formed in proximity to said open end on opposite sides of said light-shielding envelope, said ridges traversing the path of said sheet film unit so as to shield light from entering through said open end, and being semi-cylindrical in transverse sections thereof, and wherein internal terminals of said ridges are gently curved with a large radius of curvature in longitudinal sections thereof.

2. A sheet film package according to claim 1, wherein said light-shielding envelope is formed by folding a sheet of light-tight material in half to provide a folded side and then sealing an opposite side to said folded side with a sealing device.

3. A sheet film package according to claim 2, wherein said folded side has a larger folding angle in a middle portion thereof compared with end portions of said folded side.

4. A method of manufacturing a sheet film package which comprises a light-shielding envelope having an open end, and a sheet film unit movable into and out of said light-shielding envelope through said open end, said sheet film unit comprising a sheet of photographic fill and a clip for openably sealing said open end of said light-shielding envelope in a light-tight fashion when said sheet film unit is contained in said light-shielding envelope, said method comprising the steps of:

folding a sheet of light-tight material in half to provide a folded side;

sealing an opposite side to said folded side with a sealing device; and forming first and second ridges in proximity to said open end on said folded side and said opposite side of said light-shielding envelope by use of first and second embossing dies, respectively, wherein a first protrusion of said first embossing dies for forming said first ridge on said folded side is higher than a second protrusion of said second embossing dies for forming said second ridge on said opposite lateral side, by an amount determined in correspondence with a thickness of said sealing device.

5. A method according to claim 4, wherein said first and second protrusion has a shape corresponding to said first and second ridges, respectively, and each of said protrusions is semi-circular in transverse section thereof.

6. A method according to claim 5, wherein said first and second protrusions have a radius of curvature of 0.5 mm in transverse sections thereof, and said internal terminals have a radius of curvature of 22–30 mm in longitudinal sections thereof, for making said first and second ridges have a length of 8–15 mm and a maximum height of 0.2–1.0 mm.

* * * * *